(12) United States Patent
Martinez et al.

(10) Patent No.: US 9,856,078 B2
(45) Date of Patent: Jan. 2, 2018

(54) SMART GARBAGE CONTAINER WITH ANIMAL DETERRENCE ENHANCEMENT

(71) Applicants: Manuel Martinez, West Hempstead, NY (US); Jasmin Arias, West Hempstead, NY (US)

(72) Inventors: Manuel Martinez, West Hempstead, NY (US); Jasmin Arias, West Hempstead, NY (US)

( * ) Notice: Subject to any disclaimer, the term of this patent is extended or adjusted under 35 U.S.C. 154(b) by 0 days.

(21) Appl. No.: 15/161,959

(22) Filed: May 23, 2016

(65) Prior Publication Data

US 2016/0264355 A1     Sep. 15, 2016

Related U.S. Application Data

(60) Provisional application No. 62/219,665, filed on Sep. 17, 2015.

(51) Int. Cl.
| | | |
|---|---|---|
| *G08B 23/00* | (2006.01) | |
| *B65F 1/14* | (2006.01) | |
| *A01M 29/10* | (2011.01) | |
| *B65F 1/02* | (2006.01) | |
| *A01M 31/00* | (2006.01) | |

(52) U.S. Cl.
CPC ............. *B65F 1/14* (2013.01); *A01M 29/10* (2013.01); *A01M 31/002* (2013.01); *B65F 1/02* (2013.01); *B65F 2210/139* (2013.01); *B65F 2210/168* (2013.01)

(58) Field of Classification Search
None
See application file for complete search history.

(56) References Cited

U.S. PATENT DOCUMENTS

| | | | | |
|---|---|---|---|---|
| 5,562,592 | A * | 10/1996 | Curiel | B09B 3/0025 |
| | | | | 206/522 |
| 2003/0058740 | A1* | 3/2003 | Jincks | A01M 29/16 |
| | | | | 367/139 |
| 2009/0127361 | A1* | 5/2009 | Kelly | B02C 1/02 |
| | | | | 241/27 |
| 2009/0161907 | A1* | 6/2009 | Healey | B65F 1/14 |
| | | | | 382/100 |
| 2010/0155399 | A1* | 6/2010 | Wilson | A01M 29/12 |
| | | | | 220/87.2 |
| 2013/0327775 | A1* | 12/2013 | Diaz | B65F 1/122 |
| | | | | 220/315 |
| 2014/0336263 | A1* | 11/2014 | Krebs | A01M 31/002 |
| | | | | 514/627 |

* cited by examiner

*Primary Examiner* — Julie Lieu
(74) *Attorney, Agent, or Firm* — Barry Choobin; Patent 360

(57) ABSTRACT

The various embodiments herein provide a smart garbage container with animal deterrence mechanism. The smart garbage container comprises a plurality of shock absorber rings and an animal deterrent. The plurality of shock absorber rings is placed at strategically selected places in the garbage container prone to mishandling. The animal deterrent is attached to a longitudinal body surface of the garbage container. The strategically selected places primarily comprise a junction between a lower container body and a container cap, and a base of the garbage container.

13 Claims, 2 Drawing Sheets

SMART GARBAGE CONTAINER WITH ANIMAL DETERRENCE ENHANCEMENT

BACKGROUND

Technical Field of Invention

The embodiments herein generally relate to animal deterrents and particularly to garbage disposal container. The embodiments herein more particularly relate to a smart garbage container with an animal deterrence enhancement.

Description of Related Art

Animal repellents or deterrents are the products designed to keep certain animals away from any object, area, people, plants, other animals, etc. These repellents generally work by taking advantage of an animal's natural aversion to a certain thing. The animal's natural aversion to a certain thing is a thing that the animal has learned to avoid (or instinctively avoids) in its natural environment. The chemical repellents are the repellents that usually mimic the natural substances that repel or deter animals, or they are designed to be so irritating to a specific animal or type of animal that the targeted animal avoids the protected object or area. Some chemical repellents combine both the principles. In certain kind of repellents made for deer, homemade deer repellent recipes are used.

There have been animal repellents which are non-chemical type of repellents. A simple electrified or barbed wire fence that can mechanically repel the livestock or predator animals is also considered as an animal deterrent. High-frequency whistles have been used on vehicles to drive deer away from highways, and similar devices have been used to deter and repel certain types of insects or rodents. The repellents for domestic cats and dogs include ultrasonic devices that emit a high frequency noise which does not affect the humans. These types of non-chemical repellents are quite controversial because their effectiveness varies from a person to person.

One of such animal deterrent prior art discloses an animal deterrent device that generally includes a casing, a sensor, a power source and a deterrent means source. The animal deterrent devices are also used to provide protection to a target site, such as a carcass or part of a carcass left at or near the kill site from predatory animals and/or scavengers. Other uses for such device include preventing animals from disrupting trash or garbage receptacles or for preventing animals from gaining access to campsite rations, food, a temporary carcass or parts of a carcass storage area, or trash.

Another prior art discloses an animal repellent system which includes triggering means for detecting the presence of animals within a particular area and generating signals indicative thereof. The animal repellent system includes a controller operable to receive the signals generated by the triggering means and to issue command signals responsive thereto, and deterrent means for effectuating a repellent component of the animal repellent system in response to the command signals issued by the controller, thereby dissuading the animals from entering a particular area.

However, the present animal deterrents fire a deterrent signal in all the direction which uses more power and has bigger housing. Furthermore, the garbage container based animal deterrents have lower life as the rough handling of the garbage container.

In the view of foregoing, there is a need for a garbage container with an animal deterrent having a directional deterrent signal controlling and shock absorbing enhancements.

The above mentioned shortcomings, disadvantages and needs are addressed herein, as detailed below.

SUMMARY OF THE INVENTION

The primary object of the embodiments herein is to provide a garbage container with an animal deterrent with a directional deterrent signal controlling.

Another object of the embodiments herein is to provide an animal deterrent enhanced garbage container with shock absorbing enhancements.

The embodiments herein provide a smart garbage container with animal deterrence mechanism. The smart garbage container comprises a cap and a container body, a plurality of circumferentially placed shock absorbing rings, and a plurality of animal deterrents. The plurality of animal deterrents are present on the container body.

According to an embodiment herein, the plurality of animal deterrents are present vertically on a surface of the garbage container.

According to an embodiment herein, the plurality of shock absorbing rings are present at strategically selected places around the garbage container prone to mishandling.

According to an embodiment herein, the plurality of shock absorbing rings are present at a junction between the container body and the cap.

According to an embodiment herein, the plurality of shock absorbing rings are present at bottom of the container body.

According to an embodiment herein, the animal deterrent comprises a semi-cylindrical vertical plate with at least two extended sliding wings. A strobe light unit centrally located in the vertical plate, a plurality of motion sensors with radially outward line of motion sensing present on the vertical plate, a USB charging port housed in the vertical plate and a rechargeable battery. The motion sensors are placed on top and bottom of the strobe light unit and is connected to the control unit. The control unit receives a motion information from the motion sensors and assesses a distance of an intruder towards the garbage container. The USB port is connected to a rechargeable battery unit. The strobe light unit is connected to a control unit housed inside the vertical plate and the strobe light unit controls a frequency of a flashing strobe light.

According to an embodiment herein, the motion sensors, the control unit and the strobe light unit draw power from the rechargeable battery unit.

According to an embodiment herein, a power source is attached onto the container body and is connected to the rechargeable battery unit through a charging line. The power source is primarily a solar panel.

According to an embodiment herein, the animal deterrent is detachable in nature.

According to an embodiment herein, the animal deterrent is attached to the garbage container by sliding into U-shaped holding means provided on the surface of the garbage container.

According to an embodiment herein, each animal deterrent is angularly separated from an adjacent animal deterrent.

According to an embodiment herein, the angular separation between two animal deterrents range from 5°-90°.

According to an embodiment herein, an audio unit is alternatively attached in synchronization with the strobe light unit. The audio unit fires an audio signal along with the strobe light fired by the strobe light unit. The audio signal is controlled by the control unit and fired at same frequency as the frequency of the strobe light.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which:

FIG. 2A, FIG. 2B and FIG. 2C illustrates a dismantled view of the animal deterrence mechanism in smart garbage container, wherein FIG. 2A illustrates a front view of the lower container body, wherein FIG. 2B illustrates a front perspective view of the animal deterrent 200, and wherein FIG. 2C illustrates a top perspective view of the animal deterrent 200, according to embodiments herein.

DETAILED DESCRIPTION OF THE INVENTION

Figure 1:
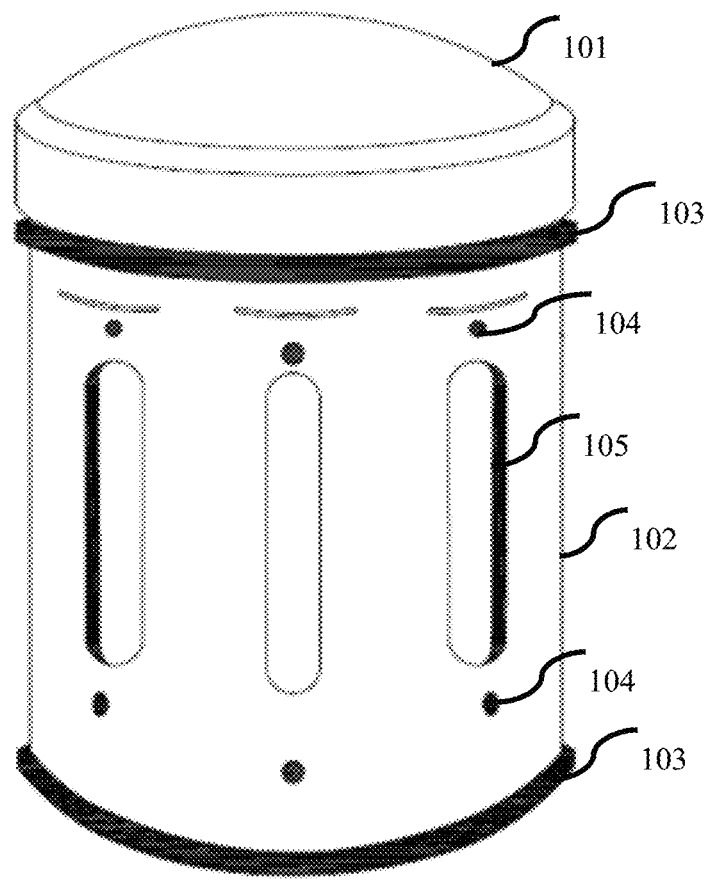
FIG. 1 illustrates a front view of a smart garbage container with animal deterrence mechanism, according to an embodiment herein.

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a smart garbage container with animal deterrence mechanism. The smart garbage container comprises a plurality of shock absorbing rings and plurality of placed animal deterrents. The plurality of shock absorbing rings are strategically placed at selected places on the garbage container prone to mishandling. The animal deterrent is attached onto a longitudinal body surface of the garbage container. The strategically selected places primarily comprise a junction between the container body and the container cap, and at the bottom of the garbage container.

According to one embodiment herein, the animal deterrent comprises a plurality of motion sensors, a control unit, a strobe light unit and a USB charging port. The motion sensors are placed on the top and bottom of the strobe unit which inturn is present centrally on the animal deterrent. The motion sensors have radially outward line of motion sensing. The control unit is housed in the animal deterrent body and is connected to the motion sensors. The control unit receives a motion information from the motion sensors and assesses a distance of an intruder towards the garbage container. The strobe light unit is connected to the control unit. The strobe light unit controls a frequency of the flashing of a strobe light. The USB charging port is provided on a surface of the animal deterrent and is connected to a rechargeable battery unit. The motion sensors, the control unit and the strobe light unit draw power from the rechargeable battery unit.

The embodiments herein provide a smart garbage container with animal deterrence mechanism. The smart garbage container comprises a cap and a container body, a plurality of circumferentially placed shock absorbing rings, and a plurality of animal deterrents. The plurality of animal deterrents are present on the container body.

According to an embodiment herein, the plurality of animal deterrents are present vertically on a surface of the garbage container.

According to an embodiment herein, the plurality of shock absorbing rings are present at strategically selected places around the garbage container prone to mishandling.

According to an embodiment herein, the plurality of shock absorbing rings are present at a junction between the container body and the cap.

According to an embodiment herein, the plurality of shock absorbing rings are present at bottom of the container body.

According to an embodiment herein, the animal deterrent comprises a semi-cylindrical vertical plate with at least two extended sliding wings. A strobe light unit centrally located in the vertical plate, a plurality of motion sensors with radially outward line of motion sensing present on the vertical plate, a USB charging port housed in the vertical plate and a rechargeable battery. The motion sensors are placed on top and bottom of the strobe light unit and is connected to the control unit. The control unit receives a motion information from the motion sensors and assesses a distance of an intruder towards the garbage container. The USB port is connected to a rechargeable battery unit. The strobe light unit is connected to a control unit housed inside the vertical plate and the strobe light unit controls a frequency of a flashing strobe light.

According to an embodiment herein, the motion sensors, the control unit and the strobe light unit draw power from the rechargeable battery unit.

According to an embodiment herein, a power source is attached onto the container body and is connected to the rechargeable battery unit through a charging line. The power source is primarily a solar panel.

According to an embodiment herein, the animal deterrent is detachable in nature.

According to one embodiment herein, the animal deterrent is detachable in nature and is attached to the garbage container by sliding into a U-shaped holding means provided on the surface of the garbage container. The U-shaped holding means are present at multiple place on the garbage container body.

According to one embodiment herein, a plurality of animal deterrents is provided on the surface of the garbage container. Each animal deterrent is angularly separated from an adjacent animal deterrent.

According to one embodiment herein, the angular separation between two animal deterrents range from 5°-90°.

According to one embodiment herein, an audio unit is alternatively attached in synchronization with the strobe light unit. The audio unit fires an audio signal along with the strobe light fired by the strobe light unit.

According to one embodiment herein, the audio signal is controlled by the control unit and fired at same frequency as the frequency of the strobe light.

FIG. 1 illustrates a smart garbage container with animal deterrence mechanism, according to one embodiment herein. With respect to FIG. 1, the garbage container comprises a cap 101 and a lower container body 102. The junction between the cap 101 and the lower container body 102 is covered by a shock absorber 103. The base of the lower container body 102 is covered by shock absorber 103 to absorb extra shock delivered during filling and vacating the garbage container. The lower container body 102 is attached with an animal deterrent comprising a plurality of motion sensors 104, a control unit (not shown), a strobe light unit 105 and a USB charging port (not shown). The motion sensors 104 are placed at an upper side and a lower side of the animal deterrent with radially outward line of motion sensing in order to sense an animal or an intruder coming towards the garbage container. The control unit is housed in the animal deterrent body and is connected to the motion sensors 104. The control unit 104 receives a motion information from the motion sensors and assesses a distance of an intruder towards the garbage container. The strobe light unit 105 is connected to the control unit. The strobe light unit 105 controls a frequency of flashing the strobe light. The USB charging port is provided on a surface of the animal deterrent and is connected to a rechargeable battery unit (not shown). The motion sensors 104, the control unit and the strobe light unit 105 draw power from the rechargeable battery unit.

According to an embodiment herein, the interval between flashing the strobe light decreases as an intruder or animal closes towards the garbage container as the distance between the intruder is directly proportional to the interval between the strobe light flashes i.e. shorter the distance between the intruder and the garbage container, faster the flashing of the strobe light.

Figure 2A:
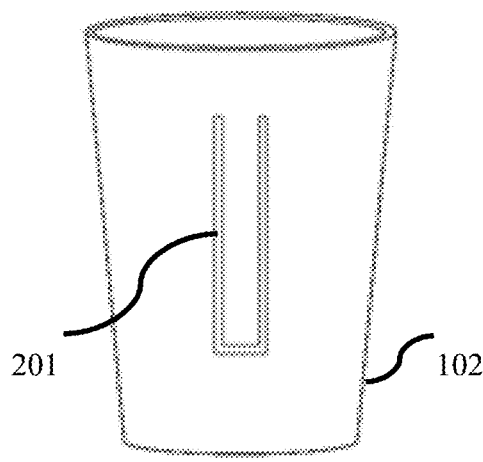
Figures 2B, 2C:
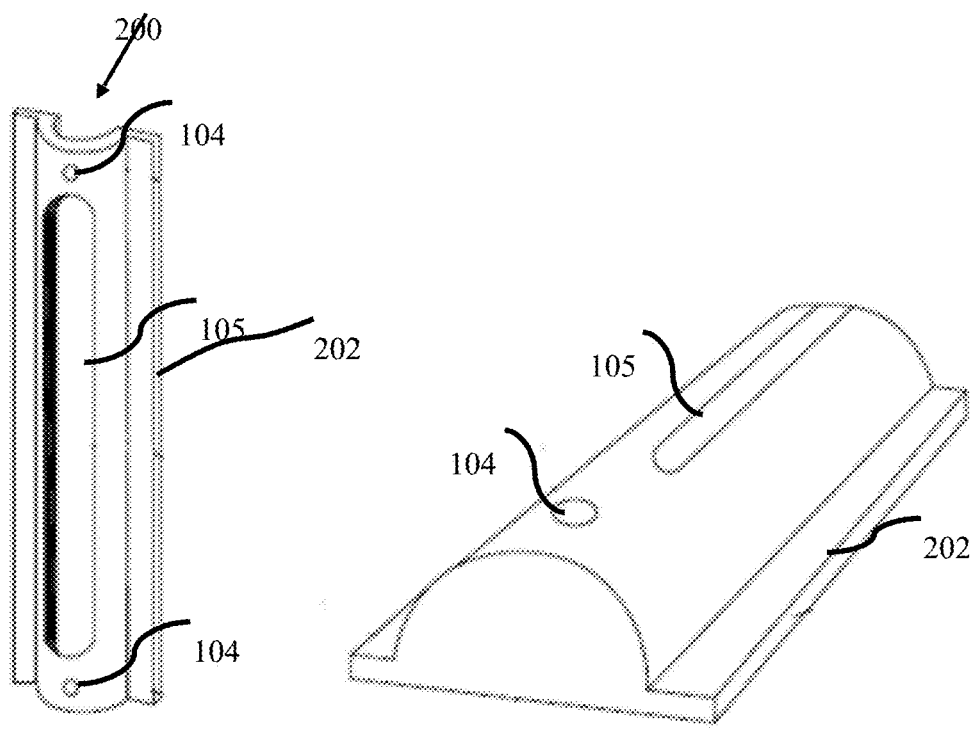

FIGS. 2A, 2B and 2C illustrates a dismantled view of the animal deterrence mechanism in smart garbage container, wherein FIG. 2A illustrates the lower container body, wherein FIG. 2B illustrates a front perspective view of the animal deterrent 200, and wherein FIG. 2C illustrates a top perspective view of the animal deterrent 200, according to embodiments herein. With respect to FIG. 2A-C, the lower container body 102 comprises a U-shaped holding means 201 for holding the animal deterrent 200. The animal deterrent 200 is semi-cylindrical in shape with two radially outward extensions known as extended sliding wings 202. The motion sensors 104, the strobe light unit 105, the control unit, the USB port and the rechargeable battery unit are placed on or inside the semi-cylindrical part of the animal deterrent. The slider wings 202 slides and held firmly into the U-shaped holding means 201.

The smart garbage container keeps any animal or intruder away from the garbage container, thus preventing a garbage from scattering. Also the least complex housing and detachable nature of the animal deterrent in the garbage container allows an easy and least expensive maintenance of the same.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

What is claimed is:

1. A smart garbage container with animal deterrence mechanism comprises: a cap and a container body;
a plurality of circumferentially placed shock absorbing rings; and
a plurality of animal deterrents, wherein the plurality of animal deterrents are present and spaced circumferentially on the container body wherein the animal deterrent comprises:
a semi-cylindrical vertical plate with at least two extended sliding wings;
a strobe light unit, wherein a strobe light unit is connected to a control unit housed inside the vertical plate, wherein the strobe light unit controls a frequency of a flashing strobe light;
a plurality of motion sensors with radially outward line of motion sensing, wherein the motion sensors are placed on top and bottom of the strobe light unit and is connected to the control unit, wherein the control unit receives a motion information from the motion sensors and assesses a distance of an intruder towards the garbage container; and
a USB charging port housed in the vertical plate and wherein the USB port is connected to a rechargeable battery unit.

2. The smart garbage container according to claim 1, wherein the plurality of animal deterrents are present vertically on a surface of the garbage container.

3. The smart garbage container according to claim 1, wherein the plurality of shock absorbing rings are present at strategically selected places around the garbage container prone to mishandling.

4. The smart garbage container according to claim 1, wherein the plurality of shock absorbing rings are present at a junction between the container body and the cap.

5. The smart garbage container according to claim 1, wherein the plurality of shock absorbing rings are present at bottom of the container body.

6. The smart garbage container according to claim 1, wherein the motion sensors, the control unit and the strobe light unit draw power from the rechargeable battery unit.

7. The smart garbage container according to claim 1, wherein a power source is attached onto the container body, wherein the power source is connected to the rechargeable battery unit through a charging line, wherein the power source is primarily a solar panel.

8. The smart garbage container according to claim 1, wherein the animal deterrent is detachable in nature.

9. The smart garbage container according to claim 1, wherein the animal deterrent is attached to the garbage container by sliding into a U-shaped holding means provided on the surface of the garbage container.

10. The smart garbage container according to claim 1, wherein each animal deterrent is angularly separated from an adjacent animal deterrent.

11. The smart garbage container according to claim 10, wherein an angular separation between two animal deterrents range from 5°-90°.

12. The smart garbage container according to claim 1, wherein an audio unit is alternatively attached in synchronization with the strobe light unit, wherein the audio unit fires an audio signal along with the strobe light fired by a strobe light unit.

13. The smart garbage container according to claim 12, wherein the audio signal is controlled by the control unit and fired at same frequency as the frequency of the strobe light.

* * * * *